Aug. 1, 1950

L. L. LIBBY

CONVERTER SYSTEM

Filed March 12, 1946

2,516,889

INVENTOR.
LESTER L. LIBBY
BY
Robert Harding Jr.
ATTORNEY

Patented Aug. 1, 1950

2,516,889

UNITED STATES PATENT OFFICE 2,516,889

CONVERTER SYSTEM

Lester L. Libby, East Orange, N. J., assignor to Federal Telephone and Radio Corporation, New York, N. Y., a corporation of Delaware Application March 12, 1946, Serial No. 653,730

6 Claims. (Cl. 250—20)

This invention relates to a converter system and more particularly to a means for improving frequency conversion in superheterodyne receivers.

In heterodyning the incoming signal with the local oscillator to produce the beat or intermediate frequency in the superheterodyne type of receiver, several factors are present which will adversely affect reception. One of these is the tendency of the oscillator to drift towards the signal frequency, known as "pulling" or "pull-in." This phenomenon will generally occur in the EHF region of the radio spectrum and above where the percentage difference between the oscillator and signal frequencies may be relatively small. Thus, when the signal frequency is 1500 kilocycles and the local oscillator frequency is 1045 kilocycles producing an intermediate frequency of 455 kilocycles, the ratio of the intermediate frequency to the oscillator frequency is of the order of 40%. However with a signal frequency of 200 megacycles and an intermediate frequency of, say, 5 megacycles, the local oscillator will oscillate at 195 megacycles and the above ratio will then be only 2½ per cent. Under these conditions the oscillator will tend to drift away from 195 megacycles and towards 200 megacycles. This will result in a loss of signal through the intermediate amplifier which is tuned to 5 megacycles.

This difficulty could be solved by increasing the intermediate frequency proportionately. However, that would result in a loss of amplification since the gain of the intermediate frequency stages becomes less at higher frequencies. Furthermore, due to a broadening of the response curve of the intermediate frequency stages at higher frequencies, there is a corresponding loss of selectivity.

Another source of distortion and another difficulty which is generally found in the pentagrid converter type is space-charge coupling. Where the percentage difference between the oscillator and signal frequencies is small, there will be coupling between the signal grid and the pulsating virtual cathode which lies between the signal grid and the screen grid. This causes oscillator frequency currents to flow through the signal grid. This will lead to lowered efficiency of conversion and overloading of the signal grid.

Another objection to the ordinary superheterodyne system employing a relatively low intermediate frequency amplifier is the presence of image frequencies in the intermediate amplifier.

It is accordingly an object of my invention to provide a heterodyne converter which avoids "pulling" of the oscillator towards the signal frequency.

It is a further object of my invention to provide a heterodyne converter which avoids the harmful effects of space charge coupling.

It is a further object of my invention to provide a heterodyne converter which has a better image rejection ratio.

All of these objects are attained without resorting to increasing the intermediate frequency and the consequent loss of amplification and selectivity.

Figure 1:
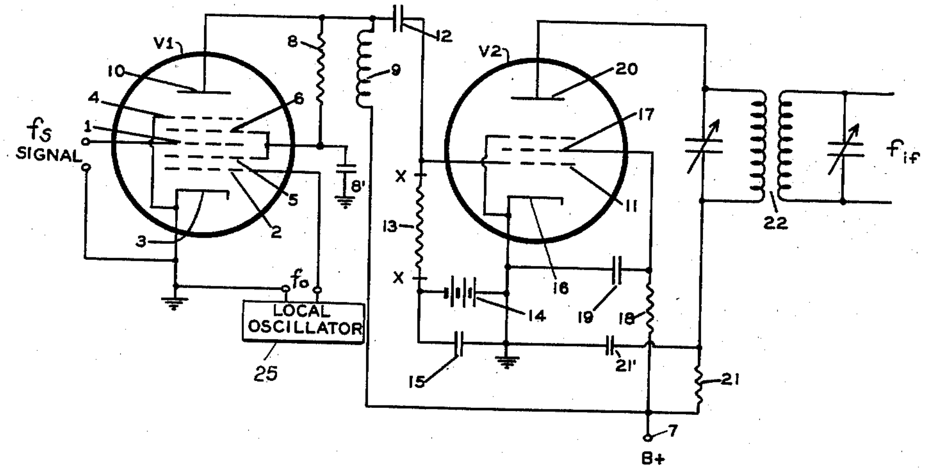
Figure 2:
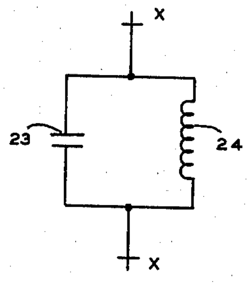

While I have outlined briefly above the several objects of my invention, a better understanding of these objects and detailed understanding of the features may be had from the particular description thereof made with reference to the drawings, in which Fig. 1 is a schematic circuit diagram incorporating the features of my invention; and Fig. 2 shows a modification of a portion of Fig. 1.

Fig. 1 shows a portion of a superheterodyne receiving circuit including a mixer tube, $V_1$, which may be of the pentagrid type, a detector tube $V_2$, and a local oscillator, 25. This portion of the circuit may be preceded by one or more stages of radio frequency amplification which are tunable over a desired band of frequencies in the conventional manner. The output of the radio frequency amplifier is the received signal, $f_s$ which is applied between the cathode 3 and the control grid 1 of the mixer tube $V_1$. The locally generated oscillations, designated $f_0$, are applied between the cathode 3 and another grid 2. The cathode 3 is grounded. The suppressor grid 4 is connected to the cathode while two screen grids 5 and 6 are connected to a source of high potential 7 through a resistor 8 and a radio frequency choke 9 which source also polarizes the anode 10. The grids 5 and 6 are by-passed to ground through a condenser 8'. The anode 10 is coupled to the signal grid 11 of the detector tube $V_2$ through a condenser 12. The grid 11 of the tube $V_2$ is biased through a resistor 13 by a source of voltage, 14, which may be a battery and which is by-passed by a condenser 15. The cathode 16 is grounded. The screen grid 17 is polarized by a source of voltage, as, for instance, the source 7 through a dropping resistor 18 and by-passed to ground by a condenser 19. The anode 20 of the tube $V_2$ is also polarized by the source of voltage 7 through a dropping resistor 21 and the primary winding of an output transformer 22. The intermediate frequency $f_{it}$ is taken from the secondary of the transformer 22. A by-pass condenser 21' is connected between the anode end of the resistor 21 and ground.

The operation of the circuit is as follows:

The local oscillator, 25, is adjusted to oscillate at a frequency equal to twice the signal frequency plus the intermediate frequency, that is, $$f_0=2f_s+f_{if}$$

The input signal $f_s$ mixes with the local oscillator oscillations $f_0$ to produce currents in the plate circuit of the mixer tube $V_1$ equal to the sum and difference frequencies: $f_s+f_{if}$; $3f_s+f_{if}$ as well as the input signals $f_s$ and $2f_s+f_{if}$. The components of the current at frequencies $f_s$ and $f_s+f_{if}$ combine in the detector tube $V_2$, by virtue of its non-linearity, to produce the difference frequency, $f_{it}$, which is coupled to the intermediate amplifier through the transformer 22. This may be followed by the conventional intermediate amplifiers, a second detector and an amplifier of the modulating signals.

It is also possible to achieve the same result by adjusting the local oscillator to produce a signal equal to twice the signal frequency minus the intermediate frequency, that is:

$$f_0=2f_s-f_{if}$$

In this case, the input signal $f_s$ mixes with the local oscillations $f_0$ to produce currents in the plate circuit of the mixer tube $V_1$ equal to the sum and difference frequencies: $3f_s-f_{if}$ and $f_s-f_{if}$ as well as the input signals $f_s$ and $2f_s-f_{if}$. The components of the current at frequencies $f_s$ and $f_s-f_{if}$ will combine in the detector tube $V_2$ by virtue of its non-linearity, to produce the difference frequency as follows:

$$f_s-(f_s-f_{if})=f_{if}$$

It may, therefore, be generalized that the frequency of the local oscillations may be either the sum or difference of twice the signal frequency and the intermediate frequency:

$$f_0=2f_s\pm f_{if}$$

The expression "algebraic sum" is used to denote the arithmetic sum or difference.

Fig. 2 shows a modification of the circuit of Fig. 1. The resistor 13, between the points marked $x$—$x$, may be replaced by the tank circuit consisting of a condenser 23 and an inductance 24. This tank circuit should have a low Q value and should be tuned to a frequency equal to $f_s\pm\frac{1}{2}f_{if}$. With this modification a greater signal strength of the desired frequencies will appear at the grid 11 of the detector tube $V_2$.

It can be observed that the local oscillator is oscillating at a frequency which is not close to the signal frequency, since it is approximately double the signal frequency. This is made possible without increasing the intermediate frequency which may still be relatively low. In this manner, "pull-in" and "space change coupling" are eliminated and high image-rejection ratio is obtained without the loss of gain or selectivity that accompanies an increase in intermediate frequency. The principle of this invention may be applied to heterodyne circuits in general and is not necessarily limited to use in connection with receivers.

While I have described the circuit and the operation thereof with particularity, it will be apparent to one skilled in the art that my invention is by no means limited to the arrangement of elements shown and described, but that many modifications may be made without departing from the scope of my inventions.

What I claim is:

1. In a superheterodyne receiver a first detector circuit, means for introducing signal waves from a given source into said receiver, means for generating waves within said receiver, means for heterodyning the said signal waves and said generated waves to obtain a modulated output thereof, means for detecting said output to obtain waves of a given intermediate frequency, the frequency of said waves generated within the receiver being equal to the vector sum of the intermediate frequency of said output waves and a plural integral multiple of the frequency of the signal waves.

2. A receiver of the heterodyne type including a mixer, a local oscillator, a detector, circuit means for introducing into said mixer signal waves from a given source and the output waves of said local oscillator, circuit means for coupling the output of said mixer to the input of said detector, circuit means for withdrawing an intermediate frequency from said detector, said waves from the local oscillator having a frequency equal to the vector sum of twice the signal wave frequency and the intermediate frequency.

3. In a first detector network of a superheterodyne receiver, a first electron discharge tube operating as a mixer which includes a cathode, an anode, and at least two signal grids disposed in the electron stream between the cathode and anode, circuit means for coupling the signal to be heterodyned to one of said grids, a source of local oscillations, circuit means for coupling said local oscillations to the other said signal grid whereby said signal and said local oscillations are mixed, a second electron discharge tube operating as a detector which includes an anode, a cathode, and at least one signal grid, circuit means coupling the output of said first electron discharge tube to said signal grid, means for withdrawing oscillations from the said anode of said second electron discharge tube, the frequency of said local oscillations being equal to the algebraic sum of the frequency of the oscillations withdrawn from the said second electron discharge tube and twice the frequency of the said signal to be heterodyned.

4. A first detector network as claimed in claim 3 in which the said grid of the said second electron discharge tube is coupled to ground through a parallel resonant circuit which is resonant at a frequency equal to the algebraic sum of the said signal frequency and one-half the frequency of the oscillations withdrawn from the said second electron discharge tube.

5. A first detector network of a superheterodyne receiver for receiving signals, including means for generating oscillations locally, means for heterodyning the received signals with said locally generated oscillations to produce modulated signals, means for intermodulating said modulated signals to provide an intermediate frequency signal, said locally generated oscillations being of a frequency equal to the algebraic sum of twice the received signal frequency and the intermediate frequency.

6. A source of signal waves of a given frequency, means for deriving intermediate frequency waves from said signal waves comprising a source of modulating waves of a frequency equal to the vector sum of said intermediate frequency and a plural integral multiple of said given frequency, means for modulating said signal waves with said modulating waves to obtain modulated waves, means for intermodulating said modulated waves to obtain said intermediate frequency waves.

LESTER L. LIBBY.

REFERENCES CITED

The following references are of record in the file of this patent:

UNITED STATES PATENTS

| Number | Name | Date |
|---|---|---|
| 1,424,866 | Wold | Aug. 8, 1922 |
| 1,941,070 | Bartley | Dec. 26, 1933 |
| 2,056,607 | Holmes | Oct. 6, 1936 |
| 2,242,791 | Ohl | May 20, 1941 |
| 2,251,397 | Case | Aug. 5, 1941 |
| 2,280,521 | Foster | Apr. 21, 1942 |
| 2,448,908 | Parker | Sept. 7, 1948 |